United States Patent
Demski

(10) Patent No.: US 10,101,189 B2
(45) Date of Patent: Oct. 16, 2018

(54) TANK LEVEL INDICATION SYSTEM WITH A LIGHTED HANDRAIL

(71) Applicant: Oshkosh Corporation, Oshkosh, WI (US)

(72) Inventor: Richard F. Demski, Parrish, FL (US)

(73) Assignee: Oshkosh Corporation, Oshkosh, WI (US)

( * ) Notice: Subject to any disclaimer, the term of this patent is extended or adjusted under 35 U.S.C. 154(b) by 150 days.

(21) Appl. No.: 15/351,285

(22) Filed: Nov. 14, 2016

(65) Prior Publication Data

US 2018/0136027 A1    May 17, 2018

(51) Int. Cl.
| | |
|---|---|
| *G01F 23/00* | (2006.01) |
| *A62C 27/00* | (2006.01) |
| *F21V 33/00* | (2006.01) |
| *F21V 23/00* | (2015.01) |
| *F21V 3/00* | (2015.01) |
| *F21V 21/40* | (2006.01) |
| *B65D 88/12* | (2006.01) |
| *B65D 90/48* | (2006.01) |
| *F21W 111/00* | (2006.01) |

(52) U.S. Cl.
CPC .......... *G01F 23/0007* (2013.01); *A62C 27/00* (2013.01); *B65D 88/128* (2013.01); *B65D 90/48* (2013.01); *F21V 3/00* (2013.01); *F21V 21/40* (2013.01); *F21V 23/003* (2013.01); *F21V 33/0064* (2013.01); *F21W 2111/00* (2013.01)

(58) Field of Classification Search
CPC ... G01F 23/0007; B65D 90/46; B65D 88/128; F21V 21/40; F21V 23/003; F21V 33/0064; F21V 3/00; A62C 27/00; F21W 2111/00
See application file for complete search history.

(56) References Cited

U.S. PATENT DOCUMENTS

| | | | |
|---|---|---|---|
| 8,181,515 B2 * | 5/2012 | Stephens | G01F 23/0007 73/290 R |
| 2015/0362350 A1 * | 12/2015 | Miller | G01F 23/2921 73/290 V |
| 2016/0216147 A1 * | 7/2016 | Johnson | G01F 23/02 |
| 2018/0136029 A1 * | 5/2018 | Marquardt | G01F 23/292 |

* cited by examiner

*Primary Examiner* — David V Bruce
(74) *Attorney, Agent, or Firm* — Foley & Lardner LLP

(57) ABSTRACT

A fire apparatus includes a chassis, a tank, a sensor, a controller, and a handrail. The tank is coupled to the chassis and configured to store a liquid. The sensor is associated with the tank and configured to provide sensor data relating to a level of the liquid in the tank. The controller is in communication with the sensor and configured to monitor the level of the liquid in the tank based on the sensor data. The handrail is coupled to the chassis, and the handrail includes a housing and a light source coupled to the housing and in communication with controller. The controller is configured to selectively illuminate the light source based on the level of liquid in the tank.

20 Claims, 13 Drawing Sheets

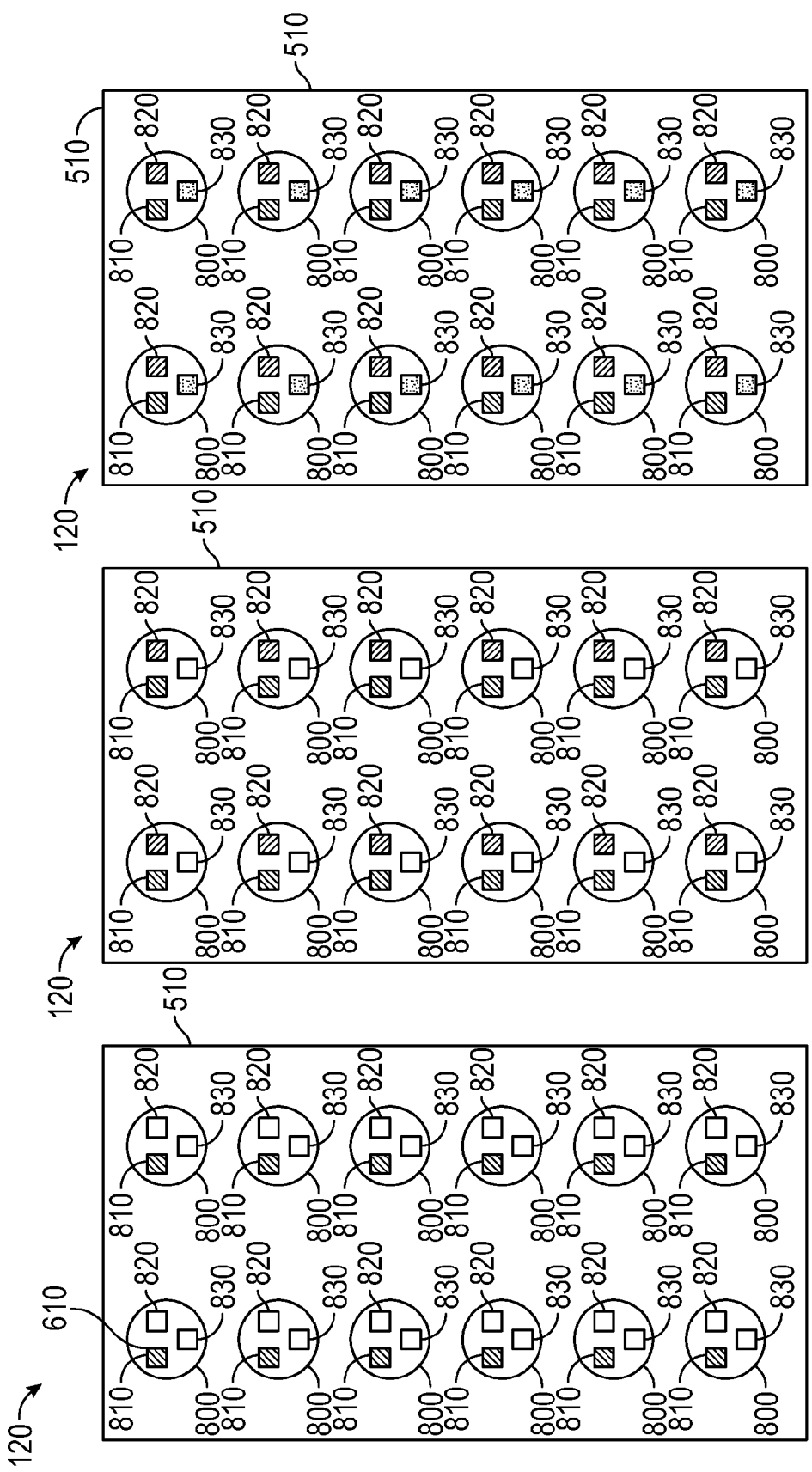

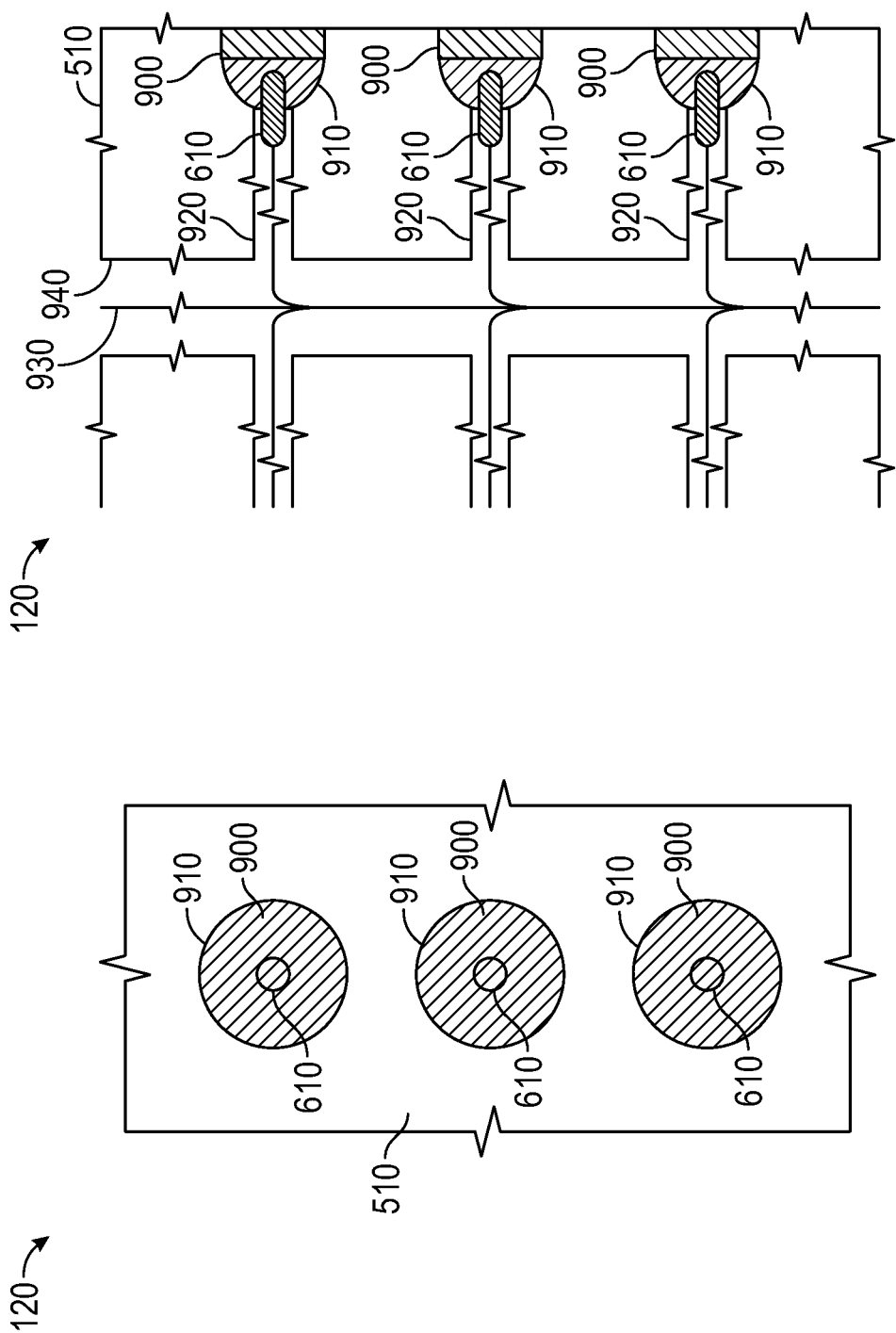

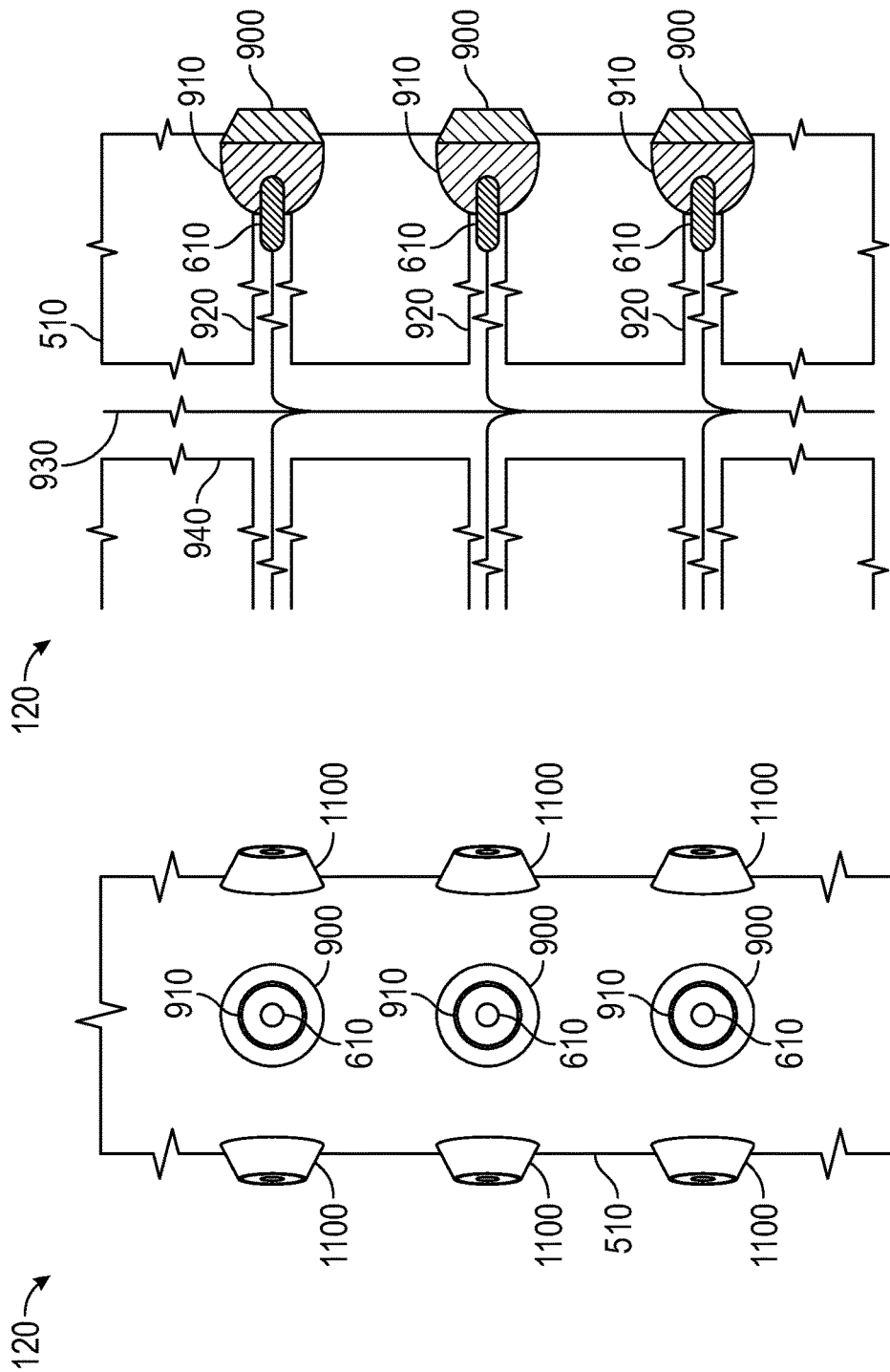

TANK LEVEL INDICATION SYSTEM WITH A LIGHTED HANDRAIL

BACKGROUND

A fire apparatus (e.g., a fire truck, etc.) may include a water tank, a sensor, a controller, and a handrail. The sensor may provide information to an operator at a control panel related to the level of water in the water tank via a gauge. The control panel may be mounted inside a cab of the fire apparatus or along a side of the fire apparatus. The gauge may be mounted substantially flush with the control panel. Traditionally, the operator is required to be within a narrow viewing angle and must remain near the gauge in order to read the gauge. In application, this limits the ability of the operator to perform essential tasks outside of the narrow viewing angle such as deploying fire hose and dispensing water from the fire hose. Accordingly, such gauges for indicating the level of water in the water tank may limit the capabilities of the operator and may not effectively communicate the level of water in the water tank to viewing locations outside of the narrow viewing angle.

SUMMARY

One embodiment relates to a fire apparatus. The fire apparatus includes a chassis, a tank, a sensor, a controller, and a handrail. The tank is coupled to the chassis and configured to store a liquid. The sensor is associated with the tank and configured to provide sensor data relating to a level of the liquid in the tank. The controller is in communication with the sensor and configured to monitor the level of the liquid in the tank based on the sensor data. The handrail is coupled to the chassis, and the handrail includes a housing and a light source. The light source is coupled to the housing and in communication with the controller. The controller is configured to selectively illuminate the light source based on the level of liquid in the tank.

Another embodiment relates to a liquid level indication system. The liquid level indication system includes a sensor, a controller, and a handrail. The sensor is configured to provide sensor data relating to a level of liquid stored in a tank. The controller is coupled to the sensor and configured to monitor the level of the liquid in the tank based on the sensor data. The handrail includes a housing and a light source. The light source is coupled to the housing and the controller. The controller is configured to selectively illuminate the light source based on a liquid level indication scheme. The liquid level indication scheme relates illumination of the handrail with the level of liquid in the tank. The controller is configured to illustrate the level of liquid in the tank to a user.

Another embodiment relates to a handrail for a fire apparatus. The handrail includes a light source, a handle portion, a lens, a first leg, and a second leg. The light source includes a first set of lighting elements and a second set of lighting elements. The handle portion defines a cavity. The cavity is configured to receive the light source. The lens is configured to cover the light source. The first leg and the second leg are configured to couple the housing to a fire apparatus. The light source is configured to be selectively illuminated by a controller to provide a first indication in a first configuration and a second indication, different from the first indication, in a second configuration.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which:

FIG. 8A is another illustration of a handrail for a fire apparatus, according to an exemplary embodiment;

FIG. 8B is an illustration of the handrail shown in FIG. 8A;

FIG. 8C is another illustration of the handrail shown in FIG. 8A;

FIG. 10A is a detailed view of a handrail for a fire apparatus, according to an exemplary embodiment;

FIG. 10B is a cross-sectional view of the handrail shown in FIG. 10A;

FIG. 11A is a detailed view of a handrail for a fire apparatus, according to an exemplary embodiment;

FIG. 11B is a cross-sectional view of the handrail shown in FIG. 11A;

DETAILED DESCRIPTION

Figure 1:
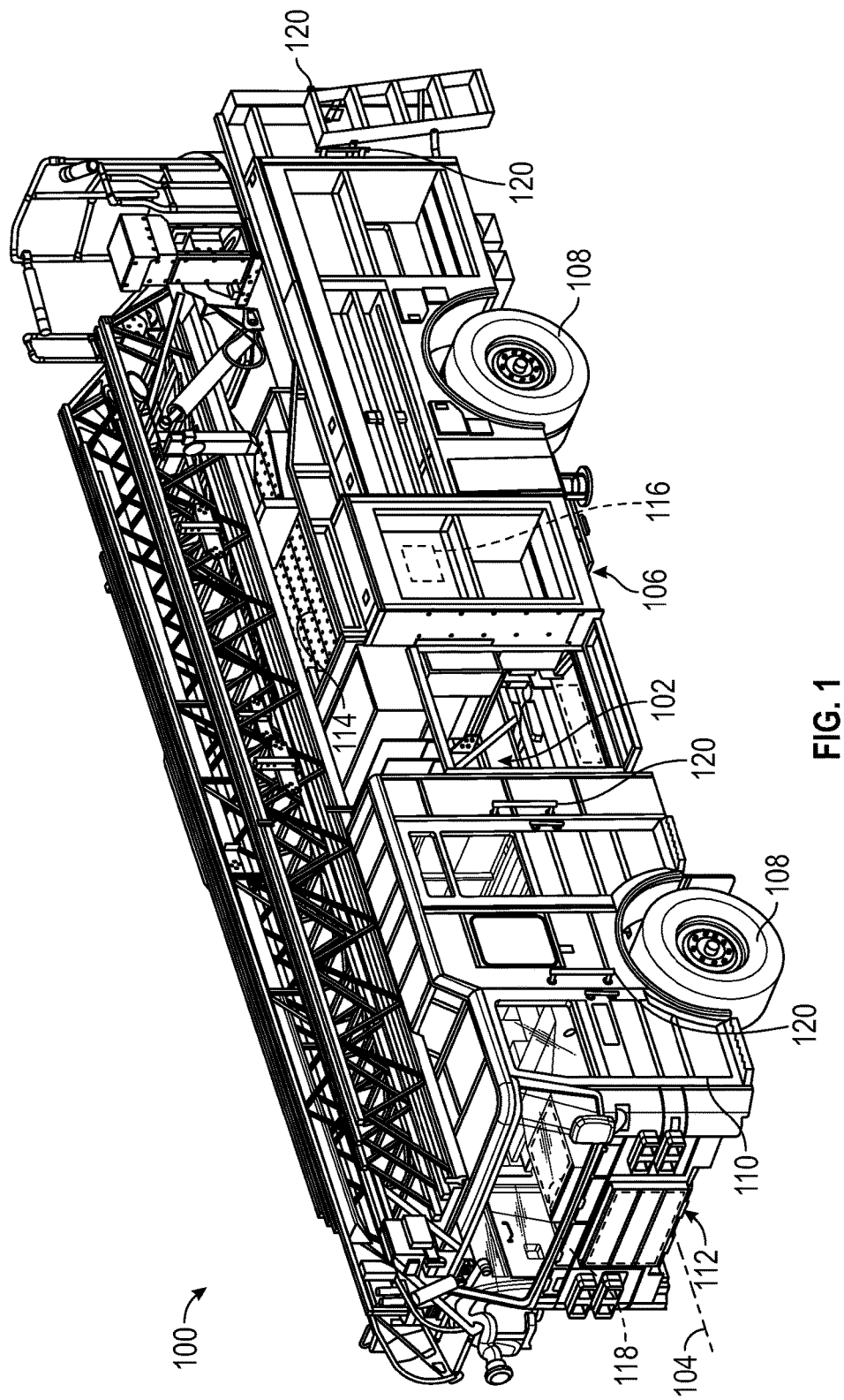
FIG. 1 is a front perspective view of a fire apparatus, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a fire apparatus includes at least one handrail that includes a light source.

The handrail is configured (e.g., shaped, positioned, textured, etc.) to be grasped (e.g., grabbed, etc.) by a user (e.g., operator, firefighter, crew member, paramedic, emergency medical technician, etc.) to assist the user in moving on or around the fire apparatus (e.g., up a step, inside a cab of the fire apparatus, etc.). The light source is coupled to a controller that is coupled to a sensor. The light source may be powered by a source (e.g., of electricity, etc.) provided with the handrail (e.g., a battery provided therein and/or therewith) and/or a source associated with the fire apparatus (e.g., hardwired to an electrical system of the fire apparatus, etc.). The sensor is associated with a tank (e.g., water tank, foam product tank, liquid tank, etc.) of the fire apparatus and configured to obtain sensor data associated with a level of liquid in the tank. The controller is configured to receive the sensor data and to monitor the level of liquid in the tank. The controller is further configured to selectively illuminate the light source based on the level of liquid in the tank. The light source may convey a level of liquid in the tank to the user through the use of a liquid level indication scheme. The light source may include a plurality of lighting elements. The lighting elements may be individually controlled or controlled in sets. The lighting elements may be arranged along a periphery of the handrail. In one embodiment, the handrail is spaced apart from a front cabin or a rear section of the fire apparatus by an offset distance. The offset distance is selected to provide a viewing angle within which a user can see the handrail. In this way, handrails can be placed on the fire apparatus in various locations and with various offset distances so as to include a desired area in at least one viewing angle such that the light source of at least one of the handrails can be seen by a user in the desired area. The handrail may include a lens disposed over at least one of the lighting elements. The lens may be textured to provide a gripping surface for the user. The lens may be mounted flush with a handle portion of the handrail or may be configured to protrude from the handrail (e.g., a base thereof, etc.), thereby providing a tactile protrusion for the user.

According to the exemplary embodiment shown in FIGS. 1-4C, a vehicle, shown as a fire apparatus 100, includes a chassis, shown as a frame 102, that defines a longitudinal axis 104. A body assembly, shown as rear section 106, axles 108, and a cab assembly, shown as front cabin 110, are coupled to the frame 102.

Referring to the exemplary embodiment shown in FIG. 1, the front cabin 110 is positioned forward of the rear section 106 (e.g., with respect to a forward direction of travel for the vehicle along the longitudinal axis 104, etc.). According to an alternative embodiment, the cab assembly is positioned behind the rear section 106 (e.g., with respect to a forward direction of travel for the vehicle along the longitudinal axis 104, etc.). The cab assembly may be positioned behind the rear section 106 on, by way of example, a rear tiller fire apparatus. In some embodiments, the fire apparatus 100 is a ladder truck with a front portion that includes the front cabin 110 pivotally coupled to a rear portion that includes the rear section 106.

As shown in the exemplary embodiment of FIG. 1, the fire apparatus 100 includes an engine 112. In one embodiment, the engine 112 is coupled to the frame 102. According to an exemplary embodiment, the engine 112 receives fuel (e.g., gasoline, diesel, etc.) from a fuel tank and combusts the fuel to generate mechanical energy. A transmission receives the mechanical energy and provides an output to a rotating drive shaft. The rotating drive shaft is received by a differential, which conveys the rotational energy of the drive shaft to a final drive (e.g., wheels, etc.). The final drive then propels or moves the fire apparatus 100. According to an exemplary embodiment, the engine 112 is a compression-ignition internal combustion engine that utilizes diesel fuel. In alternative embodiments, the engine 112 is another type of device (e.g., spark-ignition engine, fuel cell, electric motor, etc.) that is otherwise powered (e.g., with gasoline, compressed natural gas, hydrogen, electricity, etc.).

Referring to the exemplary embodiment of FIGS. 1-4A, frame 102 includes a tank (e.g., container, vessel, reservoir, etc.), shown as tank 114. Tank 114 is configured to receive, store, and dispense liquid (e.g., water, foam product, etc.). A sensor (e.g., pressure sensor, electric resistance sensor, electric capacity sensor; volumetric sensor, etc.), shown as sensor 116, is associated with (e.g., coupled to, etc.) tank 114. Sensor 116 is configured to directly interface with liquid in tank 114 and to obtain sensor data indicative of a level (e.g., volume, amount, etc.) of liquid in tank 114. Sensor 116 is communicable with (e.g., electronically coupled to, in wireless communication with, connected to, etc.) a controller (e.g., computer, central processing unit, etc.), shown as controller 118. Controller 118 is configured to analyze the sensor data from sensor 116 and monitor the level of liquid in tank 114. Controller 118 may be positioned in various locations on fire apparatus 100, around fire apparatus 100, and/or positioned remotely relative to fire apparatus 100.

Fire apparatus 100 includes a handrail (e.g., handle, handgrip, stanchion, post, bar, pillar, column, etc.), shown as handrail 120. Handrail 120 may be coupled to frame 102 at various locations such as around doors, steps, stairs, access panels, and other features of fire apparatus 100. Fire apparatus 100 may include multiple handrails 120, such as one for each door of fire apparatus 100. Handrail 120 is configured to be grasped by a user (e.g., operator, firefighter, crew member, paramedic, emergency medical technician, etc.). For example, a user may grab handrail 120 to pull themselves onto an elevated step or into a door. Handrail 120 is spaced apart from frame 102 an offset distance to facilitate interaction therewith by the user.

Handrail 120 is communicable with controller 118. Handrail 120 is configured to receive control signals from controller 118 such that a state of handrail 120 is changed in response to the control signals from controller 118. Handrail 120 includes a light source configured to be operated by controller 118, according to an exemplary embodiment. The light source may be operated by controller 118 to convey (e.g., indicate, identify, announce, etc.) the level of liquid in the tank to the user. According to various embodiments, handrail 120 includes different sets of lighting elements as the light source. In such embodiments, the sets of lighting elements of the light source may cooperate to convey (e.g., indicate, etc.) the level of liquid in tank 114 to a user. For example, the sets of lighting elements on handrail 120 may be controlled by controller 118 to indicate a level of liquid in tank 114.

Handrail 120 may be positioned at various locations on fire apparatus 100, such as proximate front cabin 110 or rear section 106. As shown in the exemplary embodiment of FIG. 2, handrail 120 is visible within an area, shown as viewing angle 200. Viewing angle 200 may be an angular range within which handrail 120 is visible to a user based on the structural configuration of fire apparatus 100 and/or handrail 120. Viewing angle 200 may be partially obscured by localized areas where handrail 120 is not visible to a user based on environmental features (e.g., smoke, trees, brush, fog, etc.) or application site features (e.g., walls, vehicles, debris, pillars, posts, etc.). However, according to various embodiments, handrail 120 is configured to reduce (e.g., minimize, etc.) the effects of environmental features and application site features on viewing angle 200 through the use of the light source and liquid level indication scheme. While viewing angle 200 is shown in FIG. 2 to terminate proximate fire apparatus 100, viewing angle 200 may extend outward a distance related to the intensity of the light source of handrail 120 (e.g., number of sets of lighting elements, number of lumens of each lighting element, etc.), environmental features, and application site features.

Figure 2:
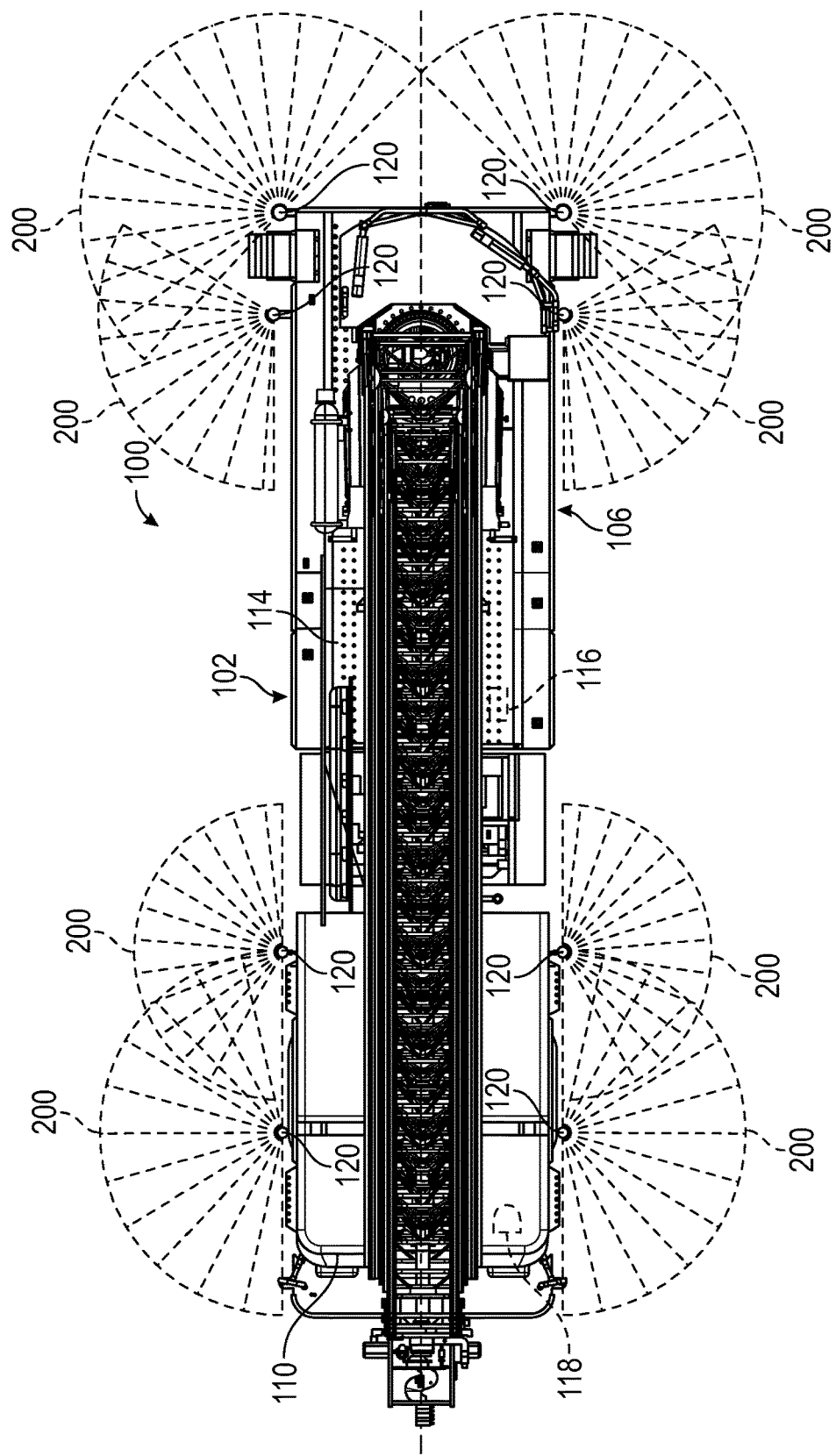
FIG. 2 is a top view of the fire apparatus of FIG. 1.
Figure 3:
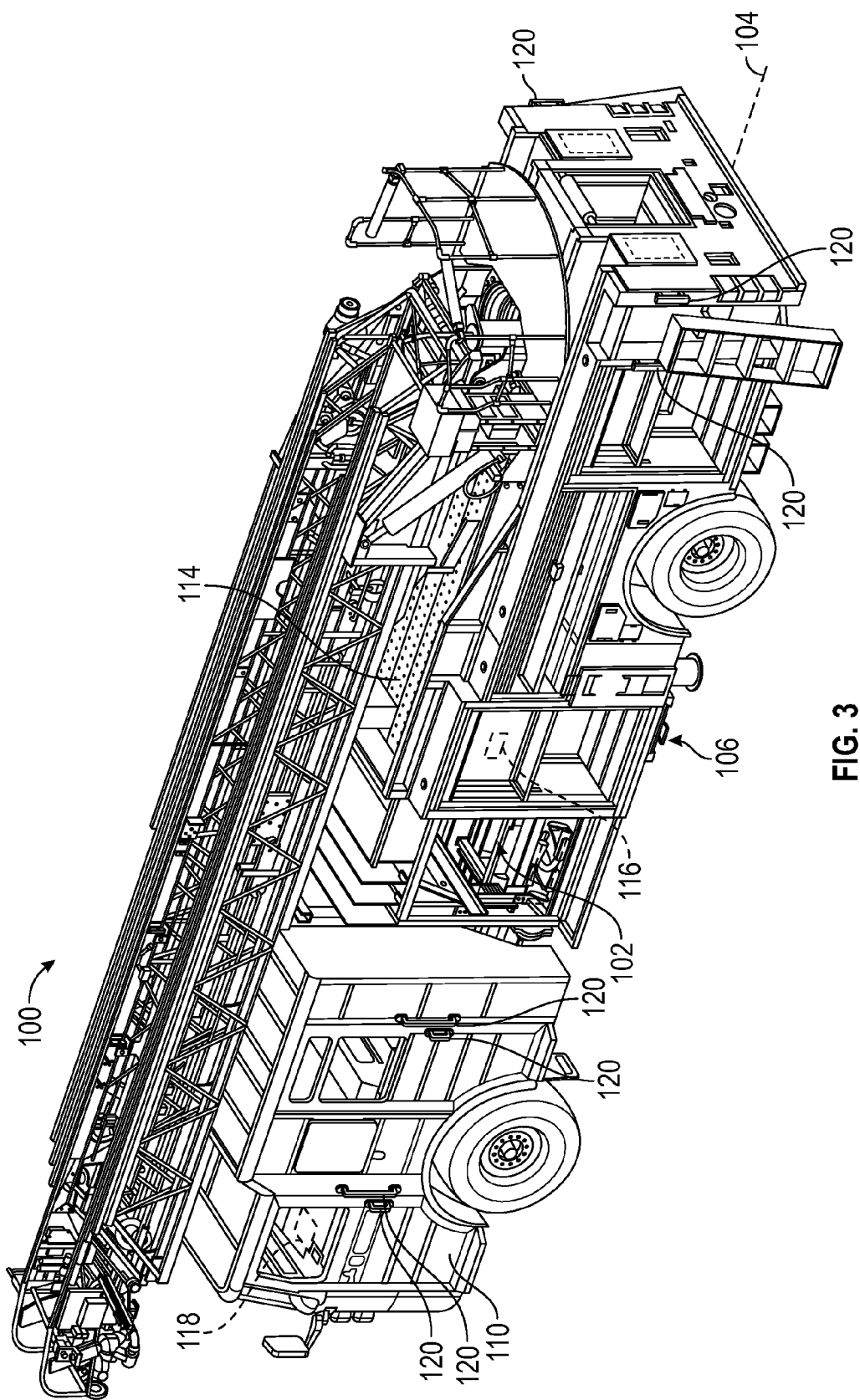
FIG. 3 is a left perspective view of the fire apparatus of FIG. 1.

In applications where fire apparatus 100 includes more than one handrail 120, viewing angles 200 may overlap, as is shown in the exemplary embodiment of FIG. 2. In other words, a user may see the light source of two handrails 120 from the same position. Conversely, in a conventional fire truck, tank level gauges and other instrumentation may have a limited viewing angle and require a user to remain in close proximity to the gauges (e.g., within two meters, etc.). Handrails 120 may be spaced apart from frame 102 an offset distance. The offset distance may be selected to provide a desired viewing angle 200. For example, for one handrail 120 at a fixed location, a first offset distance results in a larger viewing angle than a second offset distance if the second offset distance is less than the first offset distance. In other words, the farther that handrail 120 is spaced apart from frame 102, the larger the larger viewing angle 200 may be.

Fire apparatus 100 may be configured such that viewing angle 200 encompasses a target region corresponding to an area where a user may be located. In application, fire apparatus 100 may be confined to a road way (e.g., street, highway, driveway, tarmac, etc.), and the user's work may take the user a distance away from fire apparatus 100, such as when deploying or utilizing a fire hose to deliver liquid to a target. In such applications, the user may not always be in the same location relative to fire apparatus 100. Accordingly, fire apparatus 100 may be configured, such as through the use of more handrails 120 and/or different offset distances, to indicate the level of liquid in tank 114 to users at a variety of locations. As shown in FIG. 2, fire apparatus 100 includes handrails 120 at various locations along fire apparatus 100. In this manner, multiple handrails 120 may work in concert (e.g., cooperate, etc.) to cover a large area with viewing angles 200. However, handrails 120 may be placed at other locations, such as on a rear or front portion of fire apparatus 100. For example, handrail 120 may be located at a corner of fire apparatus 100. In such an example, handrail 120 may facilitate viewing angle 200 being up to two-hundred and seventy degrees.

As shown in the exemplary embodiment of FIGS. 1-4A, sensor 116 is shown within tank 114. However, in other applications sensor 116 may be outside of tank 114. Tank 114 is connected to at least one outlet. Tank 114 may be connected to an aerial output on a ladder. Tank 114 may be additionally or alternatively in fluid communication with fire hoses and other vehicles (e.g., tankers, pumpers, quints, etc.). Tank 114 may be configured to have various sizes and to receive and dispense various liquids. In some embodiments, tank 114 is configured to receive and dispense water and/or foam product, such as Class A foam or Class B foam (e.g., synthetic foam, aqueous film-forming foam (AFFF), alcohol-resistant aqueous film-forming foam (AR-AFFF), protein foam, etc.). In one embodiment, tank 114 is configured to store water and foam product in separate partitions.

Controller 118 may be located in front cabin 110, such as in a control panel or central control unit of fire apparatus 100. However, controller 118 may also be otherwise located. Controller 118 may be communicable with a server or other wireless network (e.g., cellular network, satellite network, etc.) for receiving information from a remote source. For example, controller 118 may receive commands from a central server and relay those commands to fire apparatus 100 via a cellular network. In an alternative embodiment, controller 118 is located in handrail 120. Controller 118 may be provided with handrail 120 and installed in fire apparatus 100. In these manners, handrail 120 may facilitate retrofit applications.

Conventional fire trucks may utilize tank level gauges mounted substantially flush with a wall of the fire truck and include separate, ordinary handles. Handrails 120 provide additional functionality compared to an ordinary handle without the need for a separate gauge to indicate the level of liquid in tank 114. Advantageously, handrails 120 utilize the shape and location of existing handles to more effectively communicate the level of liquid in tank 114 to a user. To provide dual functionality as both a structural handrail and a liquid level indication apparatus, handrails 120 may have a particular construction that facilitates these different and distinct functions. For example, handrails 120 may be structurally strong and resilient and stand up the wear and tear put on a handle of a fire apparatus over a service life of the fire apparatus. Typical handles on a fire apparatus are made from stainless steel tubing and are expected to last more than fifteen years. Accordingly, handrails 120 are designed to exhibit the strength, durability, corrosion resistance, and tactile characteristics of conventional stainless steel handles while providing additional functionality not currently present in handles on fire apparatuses.

Figure 4A:
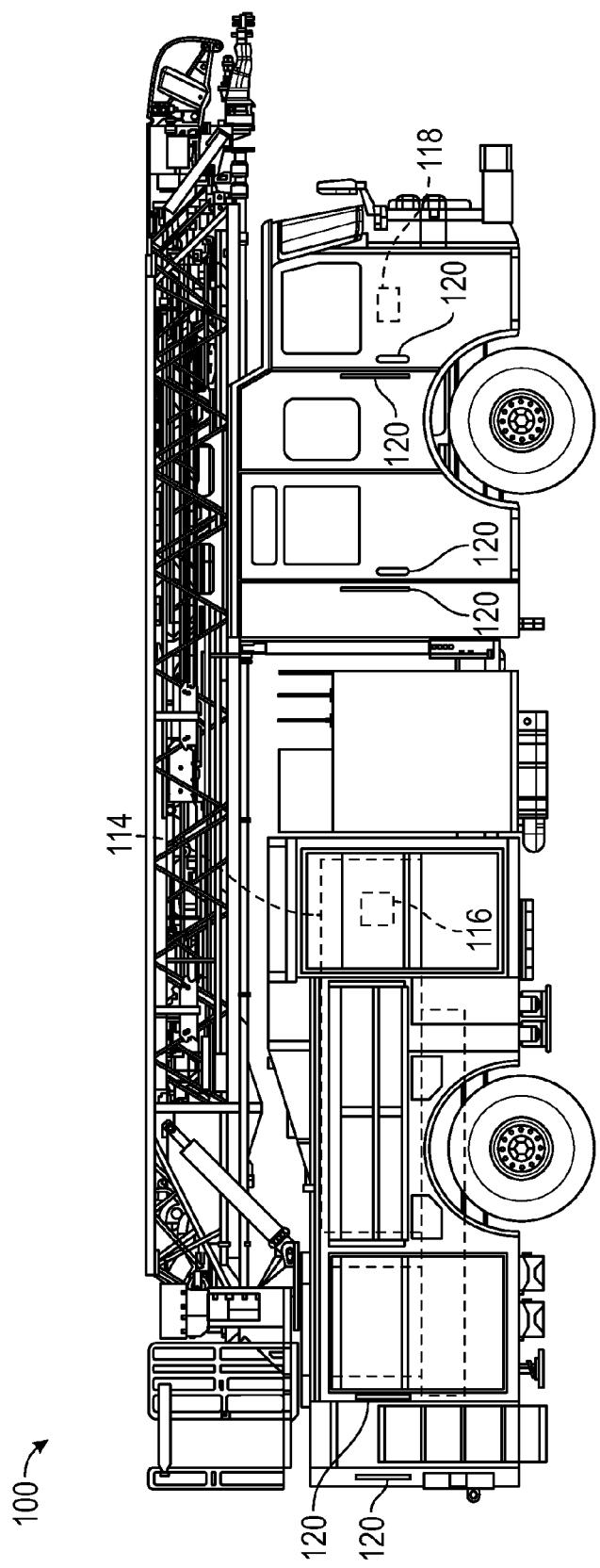
FIG. 4A is a right side view of the fire apparatus of FIG. 1.
Figure 4B:
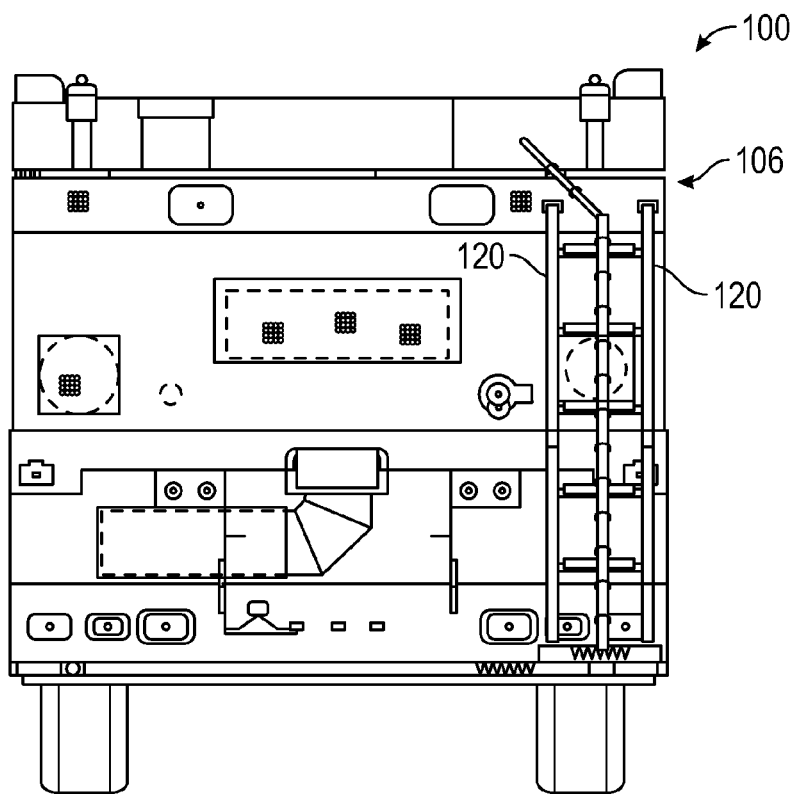
FIG. 4B is a rear view of a first apparatus, such as the fire apparatus of FIG. 1.
Figure 4C:
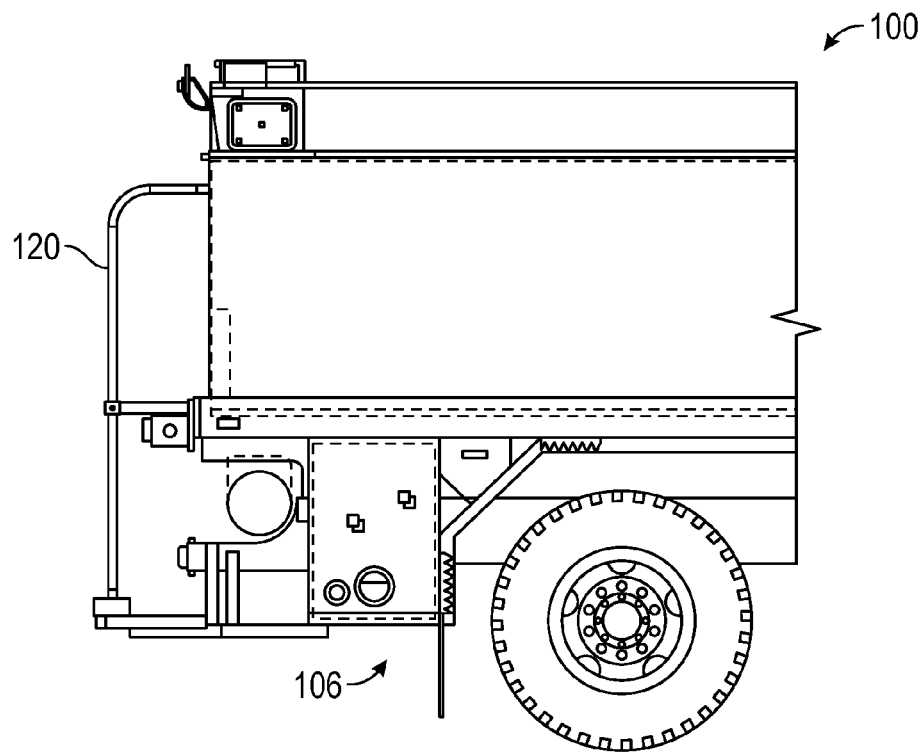
FIG. 4C is a partial right side view of a first apparatus, such as the fire apparatus of FIG. 1.

Handrails 120 may be secured directly to fire apparatus 100. Handrails 120 may be curved, bent, angled, or otherwise formed to provide structures that engage fire apparatus 100. As shown in FIGS. 4B-4C, handrails 120 are provided as part of a ladder that facilitates access to an elevated portion (e.g., hose bed, etc.) of fire apparatus 100. In this example, handrails 120 may be a section of or the entirety of the ladder (e.g., a portion of the height of side rails of the ladder, the entire height of side rails of the ladder, etc.). Handrails 120 may be implemented in similar structures on fire apparatus 100 such as aerial ladders, guard rails, and other similar structures.

Figures 5, 6:
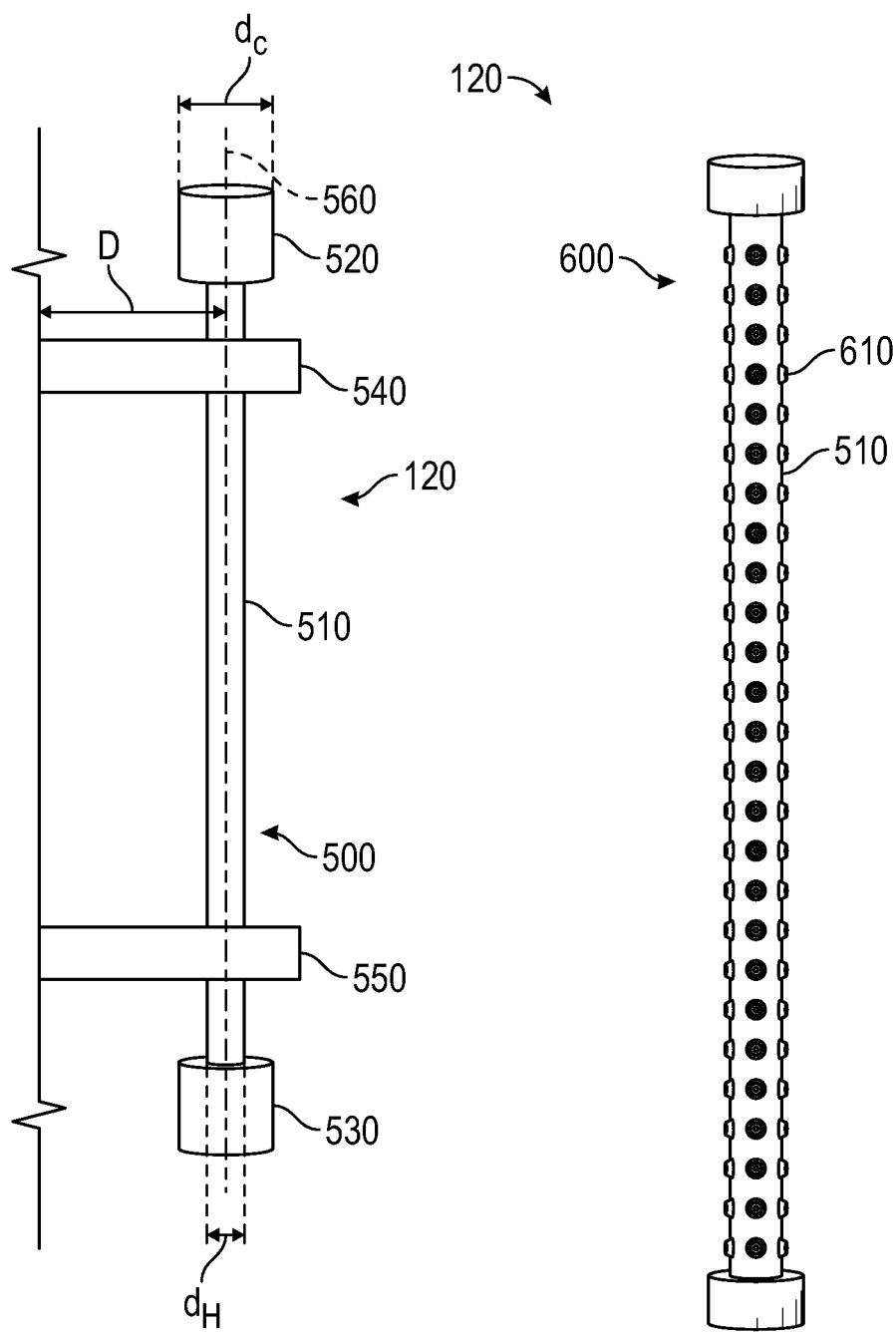
FIG. 5 is a side view of a handrail for a fire apparatus, according to an exemplary embodiment.
FIG. 6 is a front view of a handrail for a fire apparatus, according to an exemplary embodiment.

Referring now to the exemplary embodiment of FIG. 5, handrail 120 includes a housing (e.g., body, frame, etc.), shown as housing 500. Housing 500 includes a handle portion (e.g., gripping portion, interface portion, etc.), shown as handle portion 510. Handle portion 510 is configured to be gripped (e.g., grasped, held, etc.) by a user. For example, users may grasp handle portion 510 to pull themselves onto a step. Housing 500 also includes a first end (e.g., cap, knob, etc.), shown as first end 520, a second end (e.g., cap, knob, etc.), shown as second end 530, a first leg (e.g., bracket, flange, etc.), shown as first leg 540, and a second leg (e.g., bracket, flange, etc.), shown as second leg 550. According to various embodiments, first leg 540 and second leg 550 are coupled to handle portion 510 proximate first end 520 and second end 530, respectively. First leg 540 and second leg 550 secure handrail 120 to front cabin 110, rear section 106, or another portion of fire apparatus. Handle portion 510 defines an axis, shown as handle axis 560. Handrail 120 provides an offset distance, shown as offset distance D, between fire apparatus 100 and handle axis 560. The offset distance, D, may be increased to increase viewing angle 200. First end 520 and second end 530 each have a diameter, shown as $d_c$, according to the exemplary embodiment shown in FIG. 5.

Handle portion 510 may be configured to incorporate a light source. According to an exemplary embodiment, handle portion 510 is constructed from stainless steel, aluminum, steel, and/or another metallic alloy or compound. Handle portion 510 may be chrome finished, machined, anodized, coated, painted, or otherwise treated. In other applications, handle portion 510 is at least partially constructed from or include transparent or translucent material. For example, handle portion 510 may be constructed from or include transparent and translucent plastics, polymers, compounds, ceramics, and/or other synthetic materials. In some cases, handle portion 510 is at least partially constructed from a high strength glass such as Gorilla® glass, Dragontail™ glass, and Xensation® glass. Similarly, handle portion 510 may be at least partially constructed from glass laminate, polycarbonate, acrylic, glass-clad polycarbonate, and/or aluminum oxynitride.

Handle portion 510 may be constructed in a composite manner whereby an outer surface is constructed from transparent or translucent material and an inner portion is constructed from high strength metallic or polymeric material. For example, handle portion 510 may have a core portion. Following this example, the core portion may be constructed from steel, stainless steel, metallic alloys, high strength plastics, and/or other materials. In this example, the transparent or translucent material may only cover the light source of handle portion 510. In some cases, the transparent or translucent material may only cover individual lighting elements. Regardless of the particular construction, it is important that the various materials of handle portion 510 be tough, strong, resilient, and corrosion resistant (e.g., due to water, galvanic, ultra-violet mechanisms, acidic, and other mechanisms). Further, handle portion 510 may be textured or otherwise formed to provide a gripping surface for a user. For example, handle portion 510 may be knurled, patterned (e.g., Treadtex®, XTP, RTP, RSS.2, RSS.3, 2.FL, 4.LB, 3.QLT, 6.HC, 1.HM, leathergram, Cambridge, engine turn, 6-OM, 5-SM, etc.), or otherwise formed to enhance gripping of handle portion 510. Additionally or alternatively, handle portion 510 may be textured to enhance an aesthetic appearance of handle portion 510. Further, handle portion 510 may be impregnated or otherwise implanted with materials (e.g., diamond, tungsten carbide, etc.) that enhance gripping of handle portion 510 by the user. In various embodiments, handle portion 510 is cylindrical (i.e., has a cylindrical cross-sectional area). In other embodiments, handle portion 510 is elliptical, square, hexagonal, triangular, and/or otherwise polygonal. Further, in some other embodiments, handle portion 510 has an asymmetric shape.

First end 520, second end 530, first leg 540, and second leg 550 may be constructed out of the same materials and by the same processes described herein for handle portion 510. First end 520 and second end 530 may be configured to be secured to handle portion 510 via a threaded connection (e.g., threaded interface, etc.) or via a fastener. Similarly, first end 520 and second end 530 may be adhesively or permanently attached to handle portion 510. In some alternative embodiments, first end 520 and second end 530 provide additional or alternative functionality by incorporating light sources (e.g., lighting elements, etc.). For example, first end 520 and/or second end 530 may contain a high-powered lighting element or a strobe lighting element. In this fashion, light sources contained within first end 520 and second end 530 may be configured to provide additional functionality to handrail 120 such that the light source from handrail 120 cooperates with the light sources from first end 520 and second end 530. In some embodiments, handrail 120 does not include first end 520 or second end 530. For example, handle portion 510 may attach directly to first leg 540 and second leg 550 (e.g., by any of the methods and mechanisms described herein with respect to first end 520 and second end 530, etc.).

First leg 540 and second leg 550 may be configured to attach to front cabin 110 or rear section 106 via multiple mechanisms. For example, first leg 540 and second leg 550 may be fastened to front cabin 110 or rear section 106 with fasteners (e.g., nuts, bolts, etc.). First leg 540 and second leg 550 may also be welded, riveted, or structurally integrated as part of front cabin 110 or rear section 106. Similarly, first leg 540 and second leg 550 may be attached to front cabin 110 or rear section 106 with an adhesive (e.g., high-strength epoxy, etc.) or magnets. First leg 540 and second leg 550 provide the offset distance D, between front cabin 110 or rear section 106 and handle axis 560. In some alternative embodiments, first leg 540 and second leg 550 provide additional functionality by similarly incorporating light sources. In this fashion, light sources contained within first leg 540 and second leg 550 may be configured to provide additional functionality to handrail 120 such that the light sources from handrail 120 cooperate with the light sources from first leg 540 and second leg 550. According to various embodiments, first leg 540 and second leg 550 are identical. However, first leg 540 and second leg 550 may be different.

In the exemplary embodiment of FIGS. 6-12, handrail 120 includes an illumination source (e.g., light source, light, light array, light-emitting diode (LED), LED array, etc.), shown as light source 600. Light source 600 is configured to provide illumination and to be coupled to (e.g., electrically coupled to, in wireless communication with, communicable with, etc.) controller 118. Multiple light sources 600 from multiple handrails 120 may be controlled collectively or in groups by controller 118. Light source 600 includes at least one illumination element (e.g., lighting element, light, LED, bulb, etc.), shown as lighting element 610. Lighting element(s) 610 may be controlled independently, collectively, or in groups with other lighting element(s) 610. According to various embodiments, light source 600 includes a plurality of lighting elements 610. Lighting elements 610 may be LEDs, multi-color LEDs (e.g., red-green-blue (RGB) LEDs, etc.), bulbs, optical fibers, electroluminescent wire, or other devices.

Depending on the application, lighting elements 610 may be arranged in a variety of different fashions to convey information to a user. As shown in FIG. 6, lighting elements 610 are arranged in uniform, linear columns across handle portion 510. However, other arrangements of lighting elements 610 across handle portion 510 may be provided. For example, in an embodiment where handle portion 510 is cylindrical, handle portion 510 defines a circular periphery. In this example, lighting elements 610 may be arranged in at least one circumferential group along the length of handle portion 510. Lighting elements 610 in circumferential groups may be symmetrically and/or uniformly arranged. Further, the circumferential groups of lighting elements 610 may be controlled independently, collectively or in groups with other circumferential groups of lighting elements 610 or other lighting elements 610. In other applications, one or more of circumferential groups may form a band that is separated a spacing distance from another band of one or more of circumferential groups. According to various embodiments, handle portion 510 is configured such that lighting elements 610 can be located at various locations around the periphery of handle portion 510. In other words, handle portion 510 may have a lighting element 610 at any angle less than three-hundred and sixty degrees from another lighting element. In an alternative embodiment, lighting elements 610 are arranged in a pattern. For example, lighting elements 610 may be arranged in a gradient from first end 520 to second end 530. In this example, lighting elements 610 may be more concentrated proximate first end 520 or second end 530 and progressively less concentrated towards the other of first end 520 and second end 530.

Figures 7A, 7B, 7C:
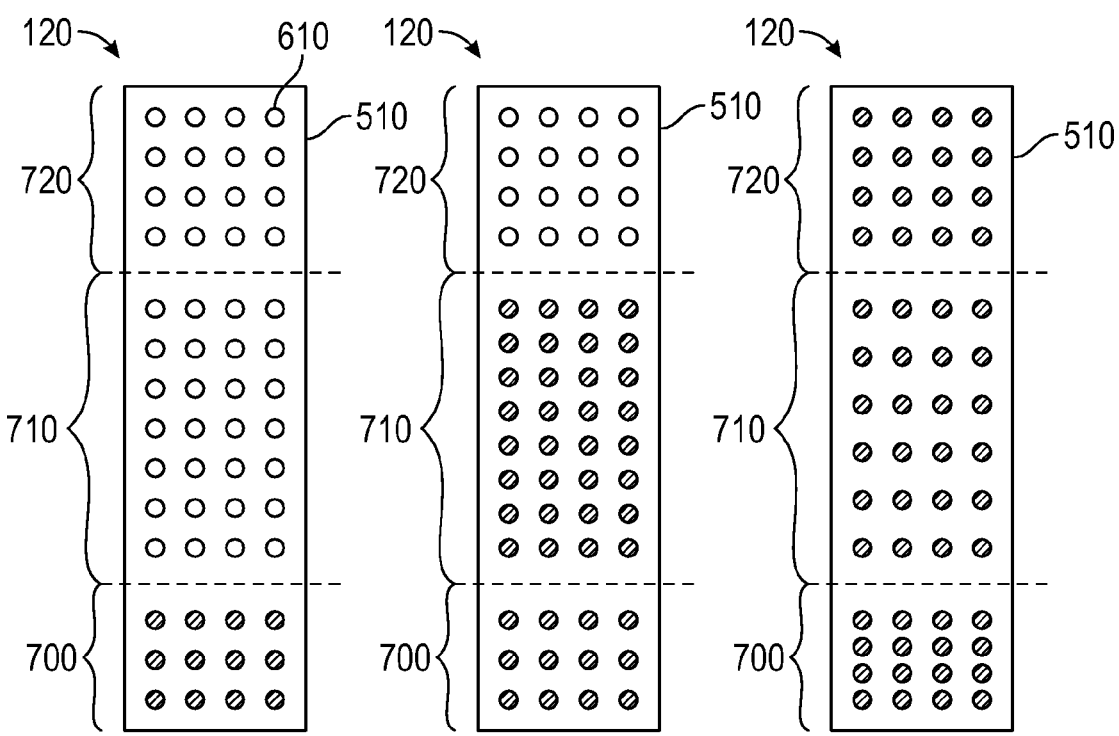
FIG. 7A is an illustration of a handrail for a fire apparatus, according to an exemplary embodiment.
FIG. 7B is an illustration of the handrail shown in FIG. 7A.
FIG. 7C is another illustration of the handrail shown in FIG. 7A.

Referring now to the exemplary embodiment shown in FIGS. 7A and 7B, lighting elements 610 are arranged into a first set (e.g., group, etc.), shown as set 700, a second set (e.g., group, etc.), shown as set 710, and a third set (e.g., group, etc.), shown as set 720. Set 700, set 710, and set 720 each include at least one lighting element 610. Set 700, set 710, and set 720 may be progressively illuminated in order to convey the level of liquid in tank 114 to a user. As shown in FIG. 7A, lighting elements 610 of set 700 are illuminated. For example, the configuration of FIG. 7A may convey a first level of liquid in tank 114 (e.g., twenty-five percent of capacity of tank 114, etc.) to a user. In FIG. 7B, lighting elements 610 of set 700 and set 710 are illuminated. Following this example, the configuration of FIG. 7B may convey a second level of liquid in tank 114 (e.g., seventy-five percent of capacity of tank 114, etc.) to a user. In FIG. 7C, lighting elements 610 of set 700, set 710, and set 720 are illuminated. Still following this example, the configuration of FIG. 7C may convey a third level of liquid in tank 114 (e.g., one-hundred percent of capacity of tank 114, etc.) to a user. It is understood that set 700, set 710, and set 720 are illustrative and that handrail 120 may incorporate additional or fewer sets and/or may be otherwise illuminated. Further, set 700, set 710, and set 720 may be arranged in different fashions than those shown. For example, set 700, set 710, and set 720 may be arranged in vertical columns. By way of another example, set 700 and set 710 may be arranged in vertical columns and set 720 may be arranged horizontally. In an alternative embodiment, only one of set 700, set 710, and set 720 is illuminated at any given time.

As shown in the embodiment of FIGS. 8A and 8B, lighting elements 610 are provided as at least one chip (e.g., microchip, etc.), shown as LED chip 800. According to various embodiments, LED chip 800 includes three lighting elements 610. Each of the lighting elements 610 in LED chip 800 may be configured to provide a different color light (e.g., green, red, blue, amber, etc.). For example, LED chip 800 may have one lighting element 610 configured to provide a red color light, another lighting element 610 configured to provide a blue color light, and yet another lighting element 610 configured to provide a green color light. Following this example, the outputs of each of the lighting elements 610 in LED chip 800 may be controlled by controller 118 to provide multiple color lights based on the red-green-blue color light mixing.

As shown in the embodiment of FIGS. 8A and 8B, lighting elements 610 are arranged into a first set (e.g., group, etc.), shown as set 810, a second set (e.g., group, etc.), shown as set 820, and a third set (e.g., group, etc.), shown as set 830, based on the color light each lighting element 610 is controlled to provide and/or provides. Following the prior example, all of the lighting elements 610 configured or controlled to provide a red color light may be assigned to set 810, all of the lighting elements 610 configured or controlled to provide a blue color light may be assigned to set 820, and all of the lighting elements 610 configured or controlled to provide a green color light may be assigned to set 830. In other words, lighting elements 610 are arranged into set 810, set 820, and set 830 based on light color.

As shown in the embodiment of FIG. 8A, lighting elements 610 of set 810 are illuminated. For example, FIG. 8A may convey a first level of liquid in tank 114 (e.g., fifteen percent of capacity of tank 114, etc.) to a user with a single color light (e.g., red, etc.). In FIG. 8B, lighting elements 610 of set 810 and set 820 are illuminated. Following this example, FIG. 8B may convey a second level of liquid in tank 114 (e.g., forty-five percent of capacity of tank 114, etc.) to a user with a single color light or a blended color light. In FIG. 8C, lighting elements 610 of set 810, set 820, and set 830 are illuminated. Still following this example, FIG. 8C may convey a third level of liquid in tank 114 (e.g., sixty-five percent of capacity of tank 114, etc.) to a user with a single color light or a blended color light. LED chips 800 may be configured to provide constant or varying color light that is either static or dynamic. In this manner, LED chips 800 may provide dynamic color-changing light from handrail 120.

Accordingly, LED chips 800 may utilize patterns of color light to provide a liquid level indication. For example, handrail 120 may appear to a user to change color (e.g., from green to red, etc.) as liquid from tank 114 is depleted. In another example, handrail 120 may utilize the circumferential groups described above to provide two different colors of light using LED chips 800.

Set 810, set 820, and set 830 are illustrative, and handrail 120 may incorporate additional or fewer sets. Further, LED chip 800 may include additional or fewer lighting elements 610, and handrail 120 may include additional or fewer LED chips 800. Set 810, set 820, and set 830 may be arranged in horizontal columns. In other embodiments, set 810 and set 820 are arranged in horizontal columns, and set 830 being arranged vertically. In an alternative embodiment, only one of set 810, set 820, and set 830 is illuminated at any given time. In this fashion, handrail 120 may be configured or controlled to provide color light of any color. In some alternative embodiments, handrail 120 is configured to simultaneous utilize both LED chips 800 and separate lighting elements 610.

Figure 9B:
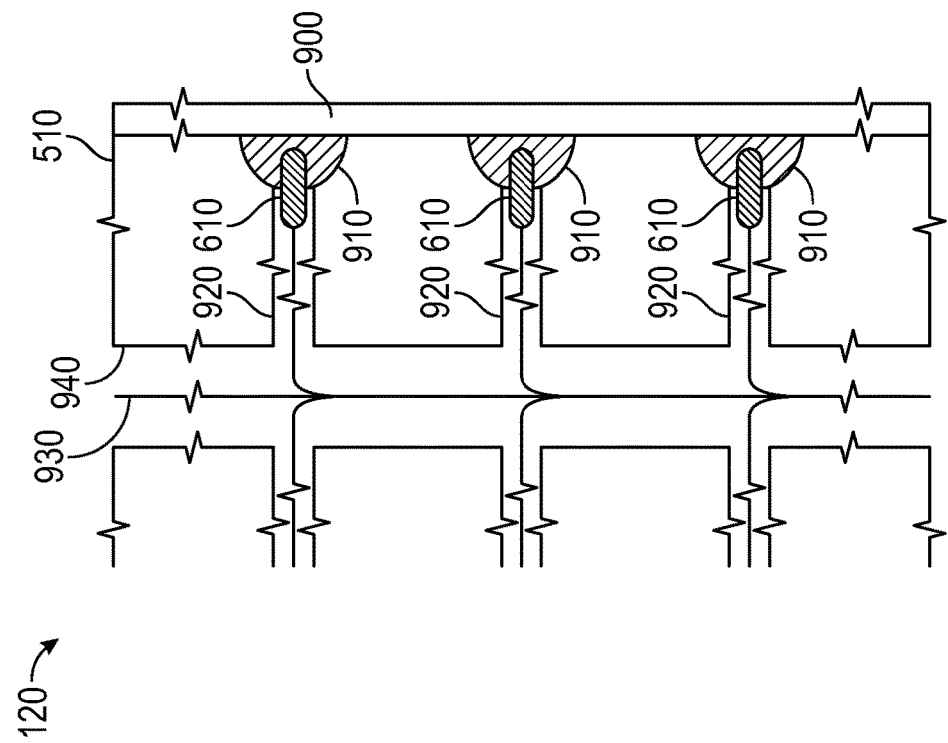
FIG. 9B is a cross-sectional view of the handrail shown in FIG. 9A.
Figure 9A:
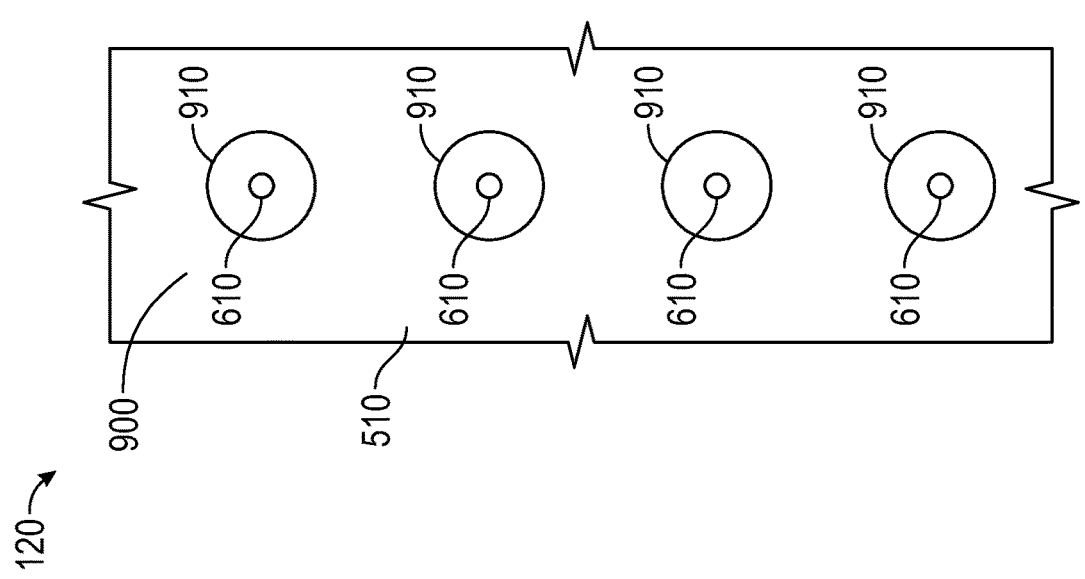
FIG. 9A is a detailed view of a handrail for a fire apparatus, according to an exemplary embodiment.

As shown in the embodiment of FIGS. 9A and 9B, handrail 120 further includes a cover (e.g., lens, etc.), shown as lens 900. Lens 900 is configured to cover handle portion 510. Handle portion 510 includes a number of recesses (e.g., cavities, depressions, etc.), shown as cavities 910, configured to receive at least one lighting element 610. According to various embodiments, cavities 910 are configured to receive LED chips 800. As shown in FIGS. 9A and 9B, each cavity 910 also corresponds to a channel (e.g., hole, etc.), shown as wiring channel 920. Wiring channel 920 is configured to couple a lighting element 610 to a wire (e.g., cable, conduit, harness, etc.), shown as main wire 930. Main wire 930 is configured to couple lighting elements 610 to controller 118. Main wire 930 is disposed within a channel (e.g., hole, etc.), shown as main channel 940. Main channel 940 is configured to facilitate coupling of lighting elements 610 to main wire 930. Main channel 940 may be concentric with a central axis of handle portion 510. As shown in FIG. 9B, lens 900 covers the entire surface of handle portion 510, including cavities 910. Lens 900 may be affixed to handle portion 510 with an adhesive (e.g., epoxy, etc.), fasteners, a friction fit, etc. Similarly, lens 900 may be structurally bonded to handle portion 510 via a manufacturing process, such as molding, melting, or fusing.

According to an exemplary embodiment, lens 900 is textured or otherwise formed to provide a gripping (e.g., textured, graspable, etc.) surface for a user. For example, lens 900 may be knurled, patterned (e.g., Treadtex®, XTP, RTP, RSS.2, RSS.3, 2.FL, 4.LB, 3.QLT, 6.HC, 1.HM, leathergram, Cambridge, engine turn, 6-OM, 5-SM, etc.), or otherwise formed to enhance gripping of lens 900. Further, lens 900 may be impregnated, embedded, or otherwise integrated with materials (e.g., diamond, tungsten carbide, etc.) that are designed to enhance gripping of lens 900 by the user. According to various embodiments, lens 900 is at least partially constructed from transparent or translucent material. For example, lens 900 may be constructed from transparent and translucent plastics, polymers, compounds, ceramics, and/or other synthetic materials. In some embodiments, lens 900 is at least partially constructed from a high strength glass such as Gorilla® glass, Dragontail™ glass, and Xensation® glass. Similarly, lens 900 may be at least partially constructed from glass laminate, polycarbonate, acrylic, glass-clad polycarbonate, and/or aluminum oxynitride. Lens 900 may be colored, tinted, mirrored, or otherwise treated. For example, lens 900 may be colored to provide light of a desired color when light is provided therethrough. In this way, lighting elements 610 may provide a first color light to lens 900, and lens 900 may provide a second color light, different from the first color light, to a user.

As shown in the embodiment of FIGS. 10A and 10B, a single lens 900 is configured to cover each cavity 910 while remaining substantially flush with handle portion 510. In these embodiments, cavities 910 are configured to receive lens 900 and at least one lighting element 610. Lens 900 may not substantially protrude from handle portion 510 and may form a watertight and weathertight seal around cavity 910. Lens 900 may be sealed to cavity 910 with various sealants, such as epoxy, resin, glue, seals, gaskets, and other similar sealing methods. Lens 900 may contain a threaded interface configured to interface with a threaded interface of cavity 910. Similarly, lens 900 may be configured to receive a fastener that may also be received by cavity 910, thus securing lens 900.

As shown in the embodiment of FIGS. 11A and 11B, a lens 900 is configured to cover each cavity 910 while protruding from handle portion 510. In these embodiments, cavities 910 may be configured to receive lens 900 and at least one lighting element 610. Lens 900 may protrude from handle portion 510 to provide a tactile protrusion on handle portion 510. Lens 900 may be shaped to provide different tactile protrusions and lighting elements 610, and corresponding cavities 910 may be spaced to provide different concentrations of tactile protrusions. In some applications, lens 900 is not received within cavities 910. In other applications, lens 900 is at least partially received within cavities 910.

Figure 12:
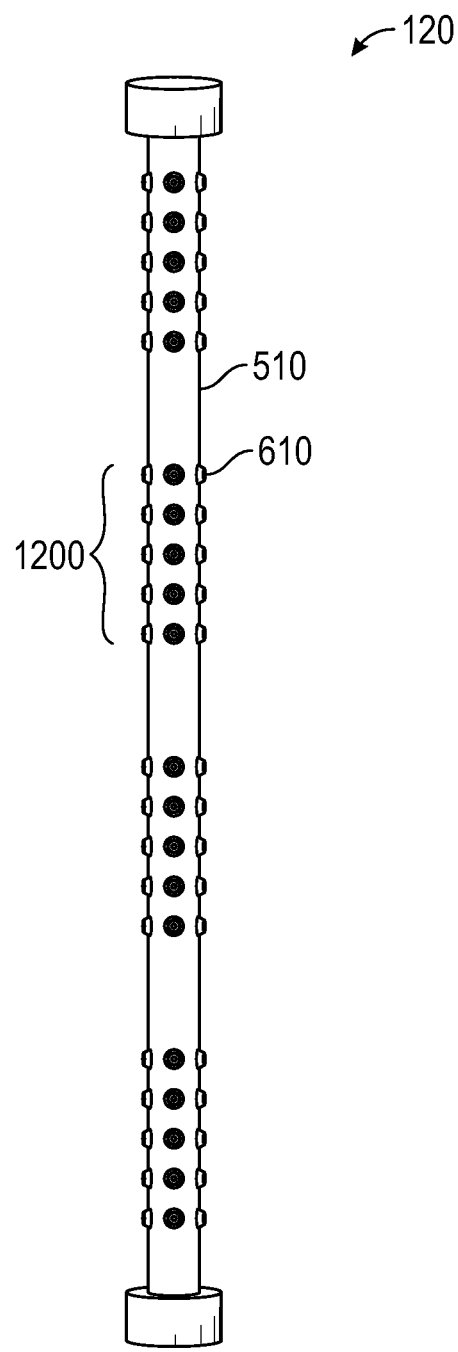
FIG. 12 is a front view of a handrail for a fire apparatus, according to an exemplary embodiment.

According to various embodiments, lens 900 includes a first portion that covers cavities 910 but is substantially flush with handle portion 510 and a second portion that covers cavities 910 and protrudes from handle portion 510. Multiple cavities 910 may be grouped together and covered with lens 900. In these applications, the multiple cavities 910 may be covered such that lens 900 protrudes from handle portion 510 in some areas and does not protrude from handle portion 510 in other areas. For example, several cavities 910 could be covered by lens 900 such that lens 900 protrudes from handle portion 510 and provides a continuous tactile protrusion for the user such as a zigzag, a straight, angled, curved, another continuous line, a discontinuous line, or other shapes (e.g., triangles, squares, circles, etc.). As shown in FIG. 12, lighting elements 610 are grouped into a band (e.g., grouping, etc.), shown as band 1200. Handle portion 510 may incorporate multiple bands 1200. In this way, handle portion 510 may alternate between portions having lighting elements 610 (in bands 1200) and portions without lighting elements 610 (e.g., providing areas for users to grab the handrail, providing grabbing areas, etc.). Bands 1200 may be collectively covered by lens 900 such that lens 900 protrudes from some areas of handle portion 510 and does not protrude from other areas of handle portion 510. In some applications, bands 1200 are angled or otherwise formed. Alternatively, handle portion 510 may incorporate a single lighting element 610 disposed in the center of handle portion 510 at various locations along the length of handle portion 510. The single lighting element 610 may be covered by lens 900. The number of lighting elements 610 may be thereby reduced, and the size of lighting elements 610 may be increased, thereby providing additional configurations of handle portion 510.

Figure 13:
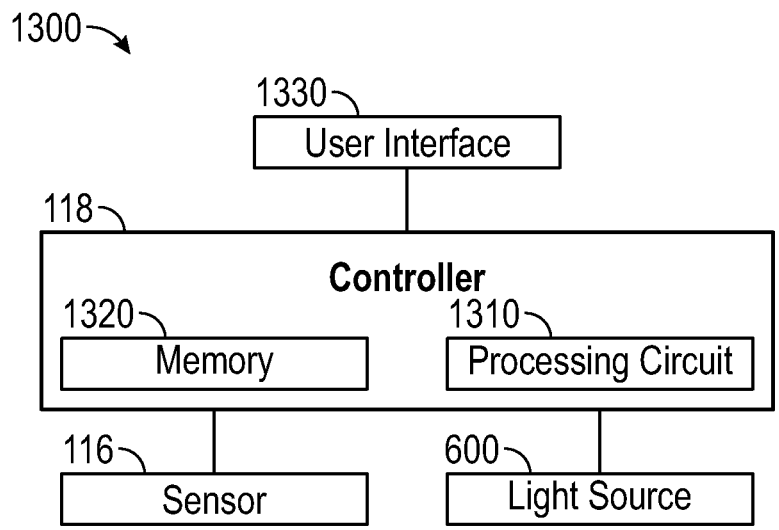
FIG. 13 is a block diagram of a liquid level indication system, according to an exemplary embodiment.

Referring now to the embodiment of FIG. 13, a system, shown as indication system 1300, includes controller 118 having a circuit, shown as processing circuit 1310, and a memory, shown as memory 1320. In one embodiment, controller 118 is configured to selectively turn on, selectively turn off, control, and/or otherwise communicate with components of handrail 120 (e.g., lighting elements 610, etc.). In some embodiments, controller 118 is configured to facilitate controlling at least some of the components of handrail 120 (e.g., based on the level of liquid in tank 114, etc.). Controller 118 is in communication with sensor 116 and light source 600 of handrail 120. Controller 118 is coupled to an interface (e.g., interactive input/output, etc.), shown as user interface 1330. User interface 1330 may be a button, joystick, knob, dial, display (e.g., touch screen display, etc.), gauge, instrument panel, or any other user interface device. In other embodiments, controller 118 is coupled to more or fewer components. Controller 118 may be configured to actively control light source 600 to control lighting elements 610 and/or sets (e.g., set 700, set 710, set 720, set 810, set 820, set 830, etc.) of lighting elements 610. By way of example, controller 118 may illuminate only particular sets of lighting elements 610. For example, controller 118 may be configured to illuminate one set of lighting elements 610 in response to an indication that a level of liquid in tank 114 is above a threshold level and illuminate another set of lighting elements 610 in response to an indication that a level of liquid in tank 114 is below the threshold level. Further, controller 118 may illuminate a first set of lighting elements 610 and a second set of lighting elements 610 in response to an indication that a level of liquid in tank 114 is above a threshold level and illuminate only the second set of lighting elements 610 if the level of liquid in tank 114 is below the threshold level. By way of example, controller 118 may send and receive signals with sensor 116, light source 600, and user interface 1330.

Controller 118 may be configured to illuminate handrail 120 (e.g., light source 600, etc.) according to a liquid level indication scheme in response to the level of liquid in tank 114, as determined based on the sensor data from sensor 116. The liquid level indication scheme may include an operational pattern for light source 600 of handrail 120 to follow. For example, the liquid level indication scheme may include varying the operational state (e.g., on, off, etc.), the brightness (e.g., the power, etc.), and the color (e.g., hue, etc.) of any of lighting elements 610 (e.g., by set, etc.) in handrail 120. In this way, the liquid level indication scheme facilitates conveying the level of liquid in tank 114 to a user.

Controller 118 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. Processing circuit 1310 may include an ASIC, one or more FPGAs, a DSP, circuits containing one or more processing components, circuitry for supporting a microprocessor, a group of processing components, or other suitable electronic processing components. In some embodiments, processing circuit 1310 is configured to execute computer code stored in memory 1320 to facilitate the activities described herein. Memory 1320 may be any volatile or non-volatile computer-readable storage medium capable of storing data or computer code relating to the activities described herein. According to an exemplary embodiment, memory 1320 includes computer code modules (e.g., executable code, object code, source code, script code, machine code, etc.) configured for execution by processing circuit 1310. Memory 1320 may include various liquid level indication schemes corresponding to handrail 120 and/or handle portion 510. In some embodiments, controller 118 represents a collection of processing devices (e.g., servers, data centers, etc.). In such cases, processing circuit 1310 represents the collective processors of the devices, and memory 1320 represents the collective storage devices of the devices. Memory 1320 may also store various threshold levels corresponding to particular sets of lighting elements 610.

In one embodiment, user interface 1330 includes a display and an operator input. The display may be configured to display a graphical user interface, an image, an icon, and/or still other information. In one embodiment, the display includes a graphical user interface configured to provide general information about light source 600, lighting elements 610 (e.g., sets of lighting elements 610, etc.), and/or level of liquid (e.g., foam product, water, etc.) in tank 114. User interface 1330 may also be configured to display a current level of liquid in tank 114, a current illumination level provided by light source 600, a rate and/or amount of liquid consumption of fire apparatus 100 from tank 114, a rate and/or amount of fuel consumption of fire apparatus 100, an amount of time liquid can be dispensed at a given rate from tank 114, an amount of time required to fill tank 114, an amount of time fire apparatus 100 can operate based on a current fuel consumption, and/or still other information relating to handrail 120 and/or the liquid in tank 114.

The operator input may be used by a user to provide commands to light source 600, lighting elements 610, a set of lighting elements 610, or other aspect of fire apparatus 100. The operator input may include one or more buttons, knobs, touchscreens, switches, levers, joysticks, pedals, dials, a steering wheel, or handles. The operator input may facilitate manual control of some or all aspects of the operation of light source 600. It is understood that any type of display or input controls may be implemented with the systems and methods described herein. According to an exemplary embodiment, controller 118 is configured to receive sensor data from sensor 116. Sensor 116 is positioned to acquire the sensor data regarding the level of liquid in tank 114. According to an exemplary embodiment, controller 118 monitors the level of liquid in tank 114 and the sensor data.

According to an exemplary embodiment, controller 118 is configured to facilitate operating handrail 120 in various modes of operation, including various illumination schemes. The previously described liquid level indication schemes are included in the illumination schemes of handrail 120 and it is understood that any of the previously described liquid level indication schemes can be implemented according to any of the illumination schemes. The illumination schemes of handrail 120 may include, for example, a constant illumination scheme, a pulsed (e.g., modulated, etc.) illumination scheme, a single color illumination scheme, a multi-color illumination scheme, and any suitable combinations thereof.

In the constant illumination scheme, lighting elements 610 may remain illuminated while fire apparatus 100 is in operation. However, as the liquid in tank 114 is depleted, some lighting elements 610 may be turned off or changed to a different color to indicate the level of liquid in tank 114 to a user. In the pulsed illumination scheme, an operational state (e.g., on/off, color, brightness, etc.) of lighting elements 610 may be changed over a period of time according to a modulation pattern during operation of fire apparatus 100. The modulation pattern may be turning lighting elements 610 on and off at a first rate when the level of liquid in tank 114 is at a first level and turning lighting elements 610 on and off at a second rate faster than the first rate when the level of liquid in tank 114 is at a second level less than the first level. The modular pattern may be also be altering between causes lighting elements 610 to provide a first color light for a first period of time and causing lighting elements 610 to provide a second color light for a second period of time less than the first period of time.

In the single color illumination scheme, lighting elements 610 may provide a single color light and to be selectively illuminated to provide an indication of the level of liquid in tank 114. For example, more lighting elements 610 may be illuminated when the level of liquid in tank 114 is at a first level than are illuminated when the level of liquid in tank 114 is at a second level less than the first level. In the multi-color illumination scheme, lighting elements 610 may be configured to provide a first color light when the level of liquid in tank 114 is at a first level and a second color light different from the first color light when the level of liquid in tank 114 is at a second level different from the first level.

Similarly, lighting elements 610 may be arranged into sets. In one illumination scheme, lighting elements 610 of a first set (e.g., set 710, etc.) may provide a first color light when the level of liquid in tank 114 is at a first level and lighting elements 610 of a second set (e.g., set 720, etc.) may provide a second color light different from the first color light when the level of liquid in tank 114 is at a second level different from the first level.

Handrail 120 may be operated in additional illumination schemes intended to provide additional functionality to handrail 120. For example, the illumination schemes of handrail 120 may further include a turn signal illumination scheme for when fire apparatus 100 is operated on a roadway and a turn signal is used, a hazard signal illumination scheme for when a hazard control is used on fire apparatus 100, a reverse illumination scheme for when fire apparatus 100 is driven in reverse, an emergency illumination scheme which may mimic typical emergency lights on fire apparatus 100 for when fire apparatus 100 is driven in an emergency mode, a spotlight illumination scheme where handrail 120 provides a constant area of light proximate fire apparatus 100 for illuminating an area such as a cabinet space, instrument panel, step, or hose bed, and a messaging illumination scheme where handrail 120 is configured to illuminate light source 600 to provide readable text or a viewable image to a user.

The various illumination schemes may be selected by a user of handrail 120 and/or fire apparatus 100 and/or automatically activated by controller 118 based on the current operation of fire apparatus 100 (e.g., dispensing liquid, receiving liquid, driving, turning, backing up, etc.). Controller 118 may actively control light source 600 based on the illumination scheme of handrail 120. According to an exemplary embodiment, controller 118 is configured to control operation of light source 600 based on the sensor data from sensor 116. In various embodiments, controller 118 is configured to provide a command to the light source 600 to selectively illuminate lighting elements 610 in response to controller 118 monitoring (e.g., determining) the level of liquid in tank 114. It is understood that various combinations of the illumination schemes described herein may also be utilized by controller 118 and light source 600.

In some alternative embodiments, controller 118 is configured to vary a position of handrail 120, (e.g., relative to front cabin 110 or rear section 106, etc.), thereby changing the offset distance D. Handrail 120 may be coupled to frame 102 via an actuator (e.g., pneumatic actuator, linear actuator, etc.), a rack and pinion system, another mechanical linkage, etc. such that the offset distance, D, is variable. For example, controller 118 may be configured to maintain handrail 120 at a first position corresponding to a first offset distance, D, while fire apparatus 100 is in a driving mode and to maintain handrail 120 at a second position corresponding to a second offset distance, D, greater than the first offset distance, D, while fire apparatus 100 is not in a driving mode. In this way, handrails 120 may be extended further away from front cabin 110 or rear section 106 when liquid is being deployed from tank 114 thereby providing a user with greater visibility of handrail 120 when desired. Similarly, controller 118 may be configured to stow (e.g., store, retract, etc.) handrails 120 along and/or inside front cabin 110 or rear section 106 when fire apparatus 100 is in a driving mode and to deploy handrails 120 from front cabin 110 or rear section 106 when fire apparatus 100 is not in a driving mode.

Figure 14:
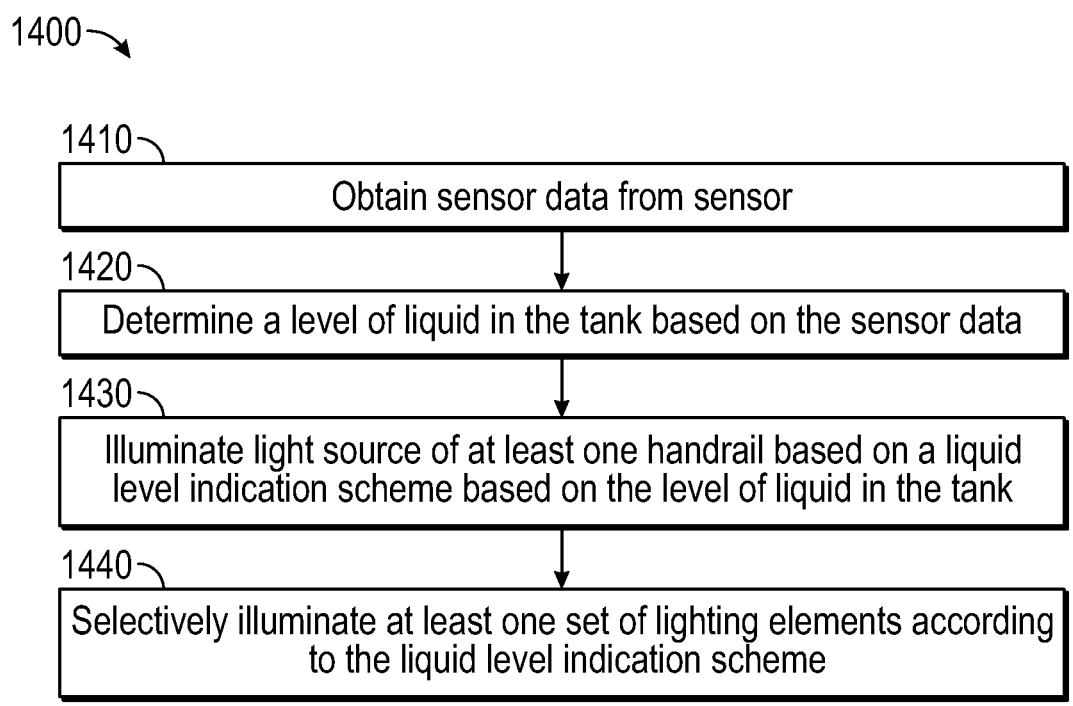
FIG. 14 is a block diagram of a method for indicating the level of liquid in a tank, according to an exemplary embodiment.

As shown in the embodiment of FIGS. 14A and 14B, a method for indicating a level of liquid in a tank, shown as method 1400, is shown include a first step 1410. In first step 1410, sensor data is obtained from a sensor associated with the tank. For example, the sensor data may be obtained from sensor 116 which is associated with tank 114. Method 1400 also includes a second step 1420. In step 1420, a level of liquid in the tank is determined based on the sensor data. For example, controller 118 may analyze and monitor the sensor data from sensor 116 to determine a level of liquid in tank 114. Method 1400 also includes a third step 1430. In step 1430, a light source of at least one handrail is illuminated based on a liquid level indication scheme that is selected based on the level of liquid in the tank. For example, light source 600 may provide a color light according to the liquid level indication scheme. Method 1400 may also include a fourth step 1440, depending on the configuration of handrail 120 and the application. In step 1440, at least one set of lighting elements of the light source is selectively illuminated according to the liquid level indication scheme. For example, one set of lighting elements 610 may be illuminated one color while another set of lighting elements 610 may be illuminated a different color. In another example, one set of lighting elements 610 is illuminated in response to a determination that the level of liquid in tank 114 is below a threshold level (e.g., fifty liters, etc.). Following this example, another set of lighting elements 610 is illuminated in response to a determination that the level of liquid in tank 114 is above the threshold level. In this way, method 1400 may utilize handrail 120 to convey a level of liquid in tank 114 to a user that is a distance away from handrail 120.

Fire apparatus 100 may be a fire truck, a pumper, a quint, an emergency vehicle, a rescue vehicle, an industrial fire apparatus, a wild fire apparatus, a military vehicle, and other suitable vehicles. Fire apparatus 100 may include a ladder, a number of wheels, a number of doors, and be configured to transport at least one user (e.g., occupant, etc.). Similarly, fire apparatus 100 may include handrails other than handrails 120. For example, fire apparatus may include several standard handrails and one handrail 120. Depending on the application, fire apparatus 100 may include multiple handrails 120 controlled independently or cooperatively by controller 118 according to the liquid level indication scheme. Further, handrails 120 can be implemented on other features and structures of fire apparatus 100. For example, handrails 120 may be implemented on gauge rails, ladder rungs, cabinet panels, ladder baskets, instrument panels, nozzles, and other similar structures. In an alternative embodiment, controller 118 is communicable with a sensor associated with a tank in a second fire apparatus and configured to receive sensor data from that sensor. In this embodiment, controller 118 may communicate with the second sensor wirelessly (e.g., over Wi-Fi, over a cellular network, over a local area network, over Bluetooth®, etc.) to receive a level of liquid in the tank of the second fire apparatus. In this embodiment, handrail 120 can be configured to selectively convey the level of liquid in tank 114 or the level of liquid in the tank of the second fire apparatus to a user. In one embodiment, handrail 120 is configured to simultaneously convey the level of liquid in tank 114 and the level of liquid in the tank of the second fire apparatus to a user. Similarly, controller 118 may be communicable with multiple fire apparatuses other than fire apparatus 100 and handrail 120 may be configured to simultaneously or sequentially convey the level of liquid in the tanks of the multiple fire apparatuses to a user.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A fire apparatus, comprising:
 a chassis;
 a tank coupled to the chassis and configured to store a liquid;
 a sensor associated with the tank and configured to provide sensor data relating to a level of the liquid in the tank;
 a controller in communication with the sensor and configured to monitor the level of the liquid in the tank based on the sensor data; and
 a handrail coupled to the chassis, the handrail comprising a housing and a light source, wherein the light source is coupled to the housing and in communication with the controller;
 wherein the controller is configured to selectively illuminate the light source based on the level of liquid in the tank.

2. The fire apparatus of claim 1, wherein the light source includes a first set of lighting elements and a second set of lighting elements; and
 wherein the controller is configured to selectively illuminate the first set of lighting elements and second set of lighting elements according to a liquid level indication scheme.

3. The fire apparatus of claim 2, wherein the controller is configured to illuminate the first set of lighting elements in response to a determination that the level of liquid in the tank is below a threshold level and illuminate the first set of lighting elements and the second set of lighting elements in response to a determination that the level of liquid in the tank is above the threshold level.

4. The fire apparatus of claim 3, wherein the first set of lighting elements and the second set of lighting elements comprise colored lighting elements; and
 wherein the first set of lighting elements is configured to provide a first color light that is different than a second color light provided by the second set of lighting elements.

5. The fire apparatus of claim 4, wherein the housing is substantially cylindrical and defines a periphery;
 wherein the first set of lighting elements and the second set of lighting elements are arranged along the periphery;
 wherein the first set of lighting elements and the second set of lighting elements are provided as a plurality of circumferential groups;
 wherein the plurality of circumferential groups are disposed within planes and arranged uniformly about an axis that is orthogonal to the planes; and
 wherein the plurality of circumferential groups are evenly spaced between a first end and a second end of the housing.

6. The fire apparatus of claim 5, wherein the first set of lighting elements has at least one lighting element oriented in a first direction, at least one lighting element oriented in a second direction at least forty-five degrees offset from the first direction, and at least one lighting element oriented in a third direction at least ninety degrees offset from the first direction; and
 wherein the second set of lighting elements has at least one lighting element oriented in a fourth direction, at least one lighting element oriented in a fifth direction at least forty-five degrees offset from the fourth direction, and at least one lighting element oriented in a sixth direction at least ninety degrees offset from the fourth direction.

7. The fire apparatus of claim 3, wherein the liquid level indication scheme comprises varying a brightness of the first set of lighting elements and the second set of lighting elements.

8. The fire apparatus of claim 3, wherein the light source is configured to provide a first color light and a second color light distinct from the first color light;
 wherein the controller is configured to engage the light source to provide the first color light in response to the determination that the level of liquid in the tank is below the threshold level; and
 wherein the controller is configured to engage the light source to provide the second color light in response to the determination that the level of liquid in the tank is above the threshold level.

9. The fire apparatus of claim 4, further comprising a body coupled to the chassis, wherein the handrail includes a handle portion, wherein the handle portion is spaced an offset distance from the body such that the light source is visible from a first direction and a second direction perpendicular to the first direction;
 wherein the handle portion defines a cavity; and
 wherein the light source is disposed within the cavity.

10. The fire apparatus of claim 9, wherein the housing includes a lens that is configured to cover the cavity;
 wherein the lens is configured to protrude from the handle portion;
 wherein the lens is configured to disperse light from the light source covered by the lens and to provide a tactile protrusion for a user; and
 wherein the lens is configured to provide a distribution of tactile protrusions on the handle portion.

11. The fire apparatus of claim 9, wherein the housing includes a lens that is configured to cover the cavity;
 wherein the lens is configured to cover the handle portion; and
 wherein the lens is configured to disperse light from the light source covered by the lens and to provide a gripping surface for the user.

12. The fire apparatus of claim 3, further comprising a body coupled to the chassis, wherein the handrail includes a handle portion;
 wherein the handle portion is spaced an offset distance from the body such that the light source is visible from a first direction and a second direction perpendicular to the first direction;
 wherein the handle portion defines a first cavity and a second cavity;
 wherein the first set of lighting elements is disposed within the first cavity;
 wherein the second set of lighting elements is disposed within the second cavity;
 wherein the housing includes a first lens that is configured to cover the first cavity;
 wherein the housing includes a second lens that is configured to cover the second cavity;
 wherein the first lens is configured to provide a first color light; and
 wherein the second lens is configured to provide a second color light different from the first color light.

13. The fire apparatus of claim 3, wherein the tank is configured to store a foam product separate from, and in addition to, the liquid;
 wherein the sensor is configured to provide additional sensor data relating to a level of the foam product in the tank;

wherein the controller is further configured to monitor the level of the foam product in the tank based on the additional sensor data; and wherein the controller is further configured to selectively illuminate the light source based on the level of the foam product in the tank.

14. The fire apparatus of claim 13, wherein the liquid level indication scheme further comprises selectively illuminating the light source based on the level of liquid in the tank and selectively illuminating the light source based on the level of the foam product in the tank.

15. A liquid level indication system comprising:
a sensor configured to provide sensor data relating to a level of liquid stored in a tank;
a controller coupled to the sensor and configured to monitor the level of the liquid in the tank based on the sensor data; and
a handrail comprising a housing and a light source, wherein the light source is coupled to the housing and the controller;
wherein the controller is configured to selectively illuminate the light source based on a liquid level indication scheme;
wherein the liquid level indication scheme relates illumination of the handrail with the level of liquid in the tank; and
wherein the controller is configured to illustrate the level of liquid in the tank to a user.

16. The liquid level indication system of claim 15, wherein the handrail includes a handle portion, wherein the light source is visible from a first direction and a second direction perpendicular to the first direction;
wherein the light source comprises a first set of lighting elements and a second set of lighting elements; and
wherein the controller is configured to illuminate the first set of lighting elements in response to a determination that the level of liquid in the tank is below a threshold level and illuminate the second set of lighting elements in response to a determination that the level of liquid in the tank is above the threshold level.

17. The liquid level indication system of claim 16, wherein the handle portion is substantially cylindrical and defined by a periphery; and
wherein the first set of lighting elements and the second set of lighting elements are arranged along the periphery.

18. A handrail for a fire apparatus, the handrail comprising:
a light source comprising a first set of lighting elements and a second set of lighting elements;
a handle portion defining a cavity, the cavity configured to receive the light source;
a lens configured to cover the light source; and
a first leg and a second leg configured to couple the housing portion to a fire apparatus;
wherein the light source is configured to be selectively illuminated by a controller to provide a first indication in a first configuration and a second indication, different from the first indication, in a second configuration.

19. The handrail of claim 18, wherein the light source is visible from a first direction and a second direction offset at least forty-five degrees from the first direction;
wherein the cavity comprises a first portion and a second portion;
wherein the first set of lighting elements is contained by the first portion and the second set of lighting elements is contained by the second portion;
wherein the first set of lighting elements is configured to provide a first color light; and
wherein the second set of lighting elements is configured to provide a second color light.

20. The handrail of claim 19, wherein the handle portion is substantially cylindrical and defined by a periphery; and
wherein the first set of lighting elements and the second set of lighting elements are arranged along the periphery such that a first lighting element from the first set of lighting elements is offset at least forty-five degrees from a second lighting element from the first set of lighting elements and such that a first lighting element from the second set of lighting elements is offset at least forty-five degrees from a second lighting element from the second set of lighting elements.

\* \* \* \* \*